Figure 1:
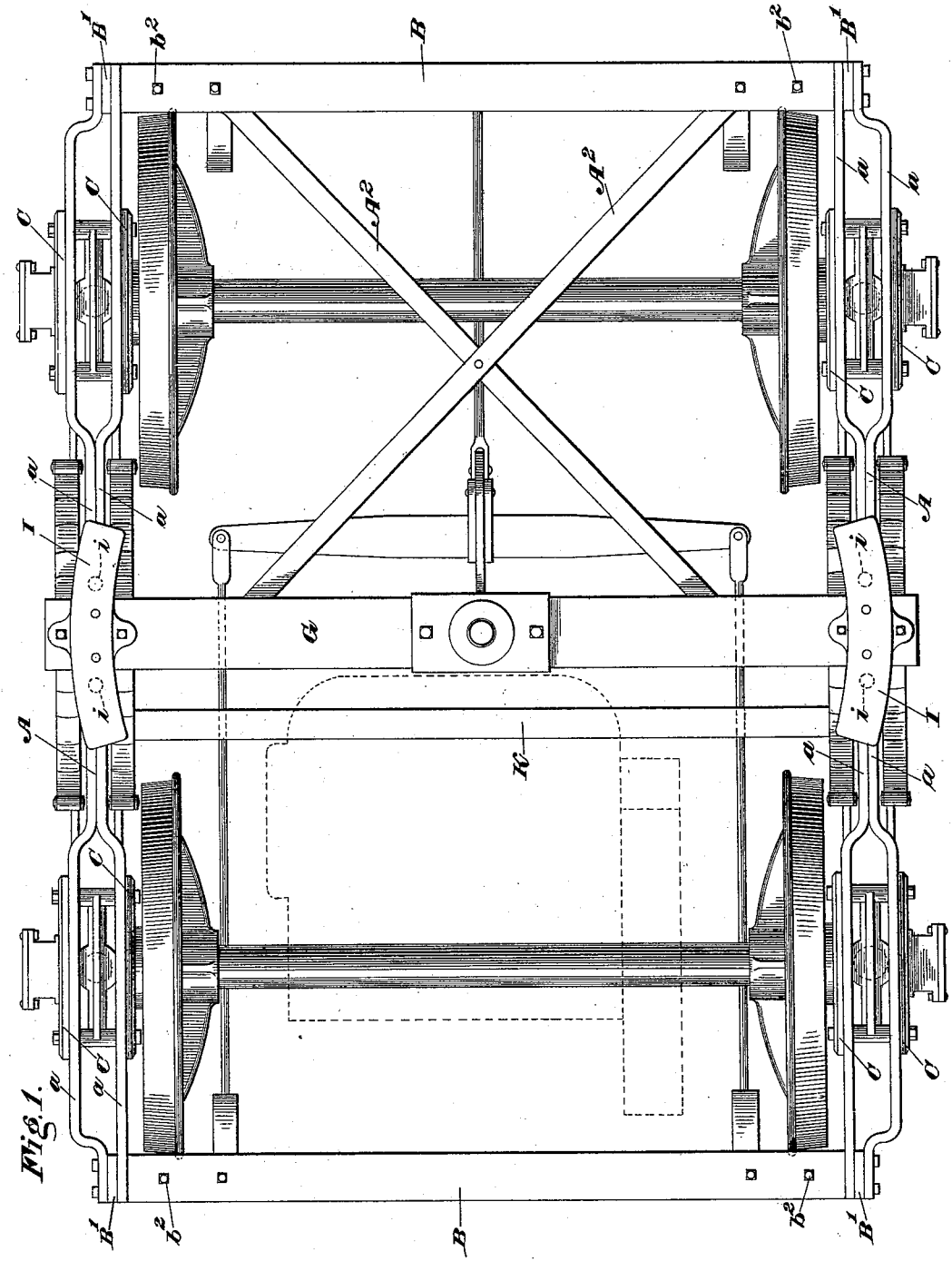

(No Model.) 3 Sheets—Sheet 1.

J. TAYLOR.
CAR TRUCK.

No. 507,855. Patented Oct. 31, 1893.

Witnesses:
M. E. Fowler
J. R. Mansfield

Inventor
John Taylor
Alexander & Dowell
By his Attorneys, (No Model.) 3 Sheets—Sheet 2.
J. TAYLOR.
CAR TRUCK.
No. 507,855. Patented Oct. 31, 1893.
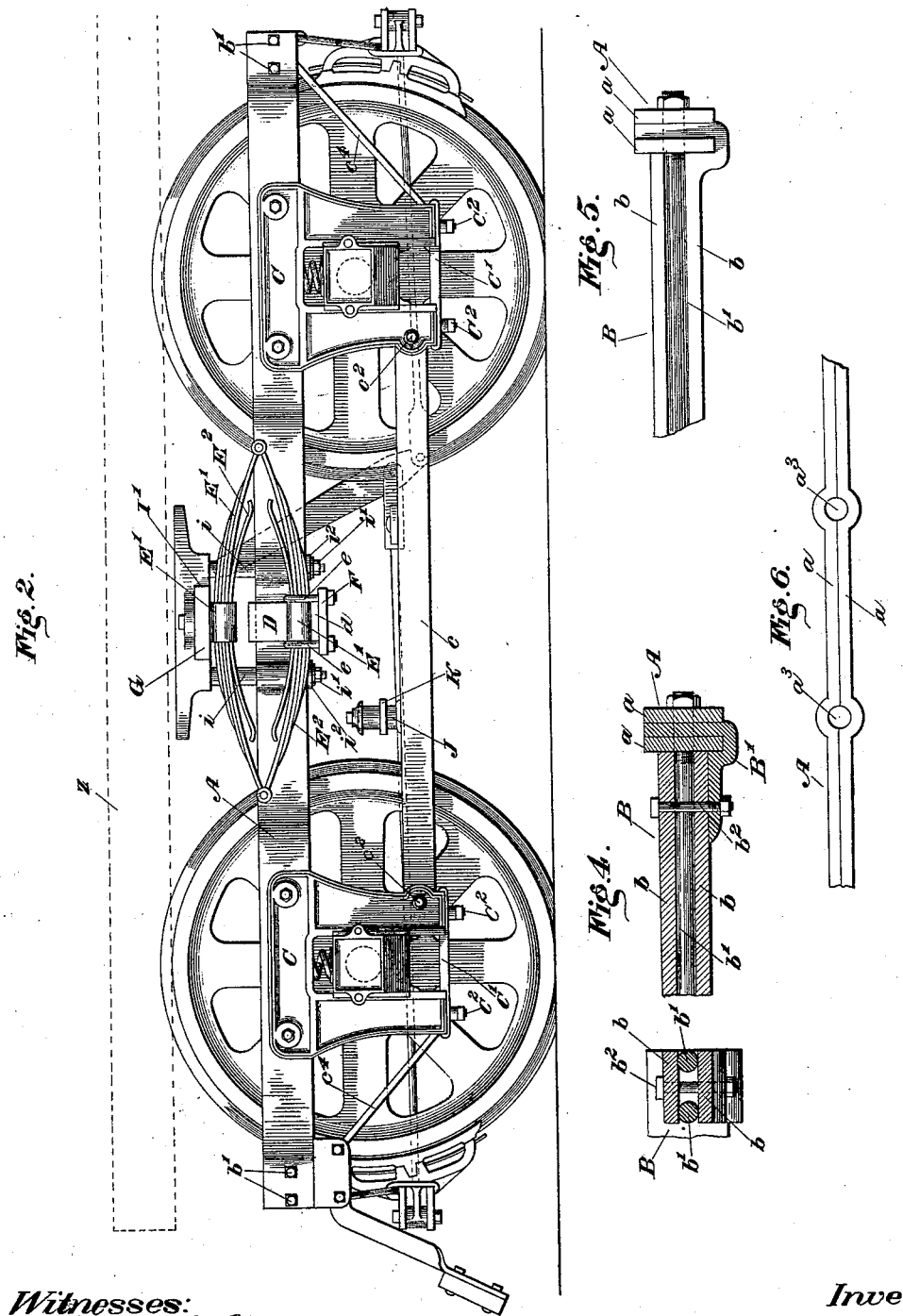
Witnesses:
M. E. Fowler
James R. Mansfield
Inventor:
John Taylor
Alexander Howell
By his Attorneys, (No Model.) 3 Sheets—Sheet 3.
J. TAYLOR.
CAR TRUCK.
No. 507,855. Patented Oct. 31, 1893.
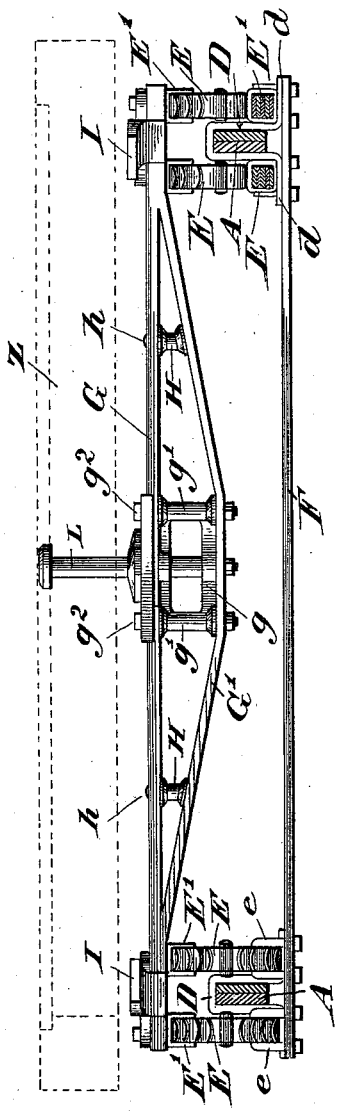
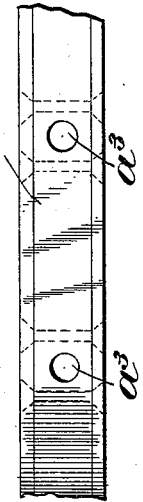
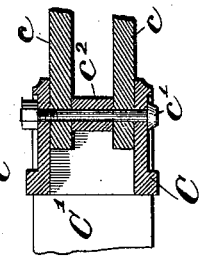
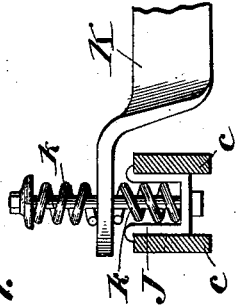
Witnesses:
M. C. Fowler
James R. Mansfield
Inventor:
John Taylor
by Alexander & Dowell
Attorneys.

UNITED STATES PATENT OFFICE.

JOHN TAYLOR, OF TROY, NEW YORK.

CAR-TRUCK.

SPECIFICATION forming part of Letters Patent No. 507,855, dated October 31, 1893.

Application filed April 12, 1893. Serial No. 470,047. (No model.)

*To all whom it may concern:*

Be it known that I, JOHN TAYLOR, of Troy, in the county of Rensselaer and State of New York, have invented certain new and useful Improvements in Car-Trucks; and I do hereby declare that the following is a full, clear, and exact description thereof, reference being had to the accompanying drawings, and to the letters of reference marked thereon, which form part of this specification.

This invention is an improvement in car trucks, and is especially designed for electric railway cars wherein two four-wheeled trucks are employed, one at each end, such trucks being commonly termed "pivotal" trucks.

The objects of the invention are to produce a pivotal truck having a short wheel base, and wheels of equal diameter and the pivot on a king bolt connected to a bolster located centrally between and above the axles so as to allow ample space for the reception of electric motors at either side of the bolster, and to permit ready access to the motor case by having room enough to allow the top of case to be swung up, and the bottom of case to be lowered so that the armature can be conveniently examined or removed and replaced without disturbing or taking apart any piece of the truck or of the car body.

Other objects are to overcome jarring, pounding and rocking of the car body by the passage of the truck around curves, or over rail joints, switches, crossings, &c., by mounting the truck frames on the axles by long coiled springs over each journal, and by employing full elliptical springs, one on each side of each side beam intermediate the wheels upon which springs the bolster is supported.

I also reduce the width of the side beams, or distance apart of the members thereof intermediate the pedestals so that the truck will be reduced in width yet have room for the inside elliptic springs to clear the wheels, while the outer springs project but slightly beyond the axle boxes or pedestals, so that the sides of truck or parts thereof shall not project beyond the sides of the car body.

Another object of my invention is to provide a pivotal truck, which when used in electric cars will admit of their being run at a high speed around curves with perfect safety and without any necessity for slowing up, as it is generally necessary to do when the trucks for electrical railway cars are used, and by my construction the cross beams on each side of the truck bolster which have been employed in pivotal trucks for steam cars are done away with, thus enabling the wheel base to be smaller than where they are used, and yet my truck frame is simple, strong and durable, and will be positively safe when running at a high rate of speed.

My invention therefore consists in the novel construction of the truck frame, and in novel details of construction, and sub-combinations of parts which I will now describe in detail, referring to the drawings, in which—

Figure 1 is a top plan view of my improved truck. Fig. 2 is a side elevation thereof. Fig. 3 is a vertical transverse sectional view on line 3—3 Fig. 2. Figs. 4, 5, 6, 7, 8, 9 and 10, are details.

The main frame is composed of side beams A and end beams B. The side beams are formed of two parallel flat metal bars $a$ set edgewise. Between the pedestals these bars touch, and are rigidly united by welding, riveting, bolts, or other suitable means separated over the axles where the pedestals C, C, are attached to them so as to accommodate long coil springs, and spring caps such as are shown and described in my Patent No. 455,990, of July 14, 1891. The ends of bars $a$ are rigidly united at the extremities of the beam. The end beams B are also constructed of two flat metal bars $b$ laid flatwise, one above the other, and between the ends of beams A, A, to which they are rigidly united by means of transverse tie rods $b'$ lying intermediate bars $b$ and extending through suitable openings in bars $a$ as shown, and preferably nutted at both ends.

An angular bracket casting B' may be employed as shown in Fig. 2 at the corners of the frame, one arm of the bracket being embraced between bars $a$ and transfixed by rods $b'$ while the other arm of the bracket underlies the ends of the lower bar $b$ and is transfixed by bolt $b^2$, extending through both bars $a$, as shown. Instead of using the bracket B', the ends of the lower bar $b$ may be bent as shown in Fig. 4 so as to enter between the ends of bars $a$. The bars $b$ may also be bound together by intermediate bolts. I would also say that the corners of the frame may be made with corner irons as shown in my patent aforesaid. By this construction of frame the side beams are capable of withstanding the severe twisting and thrusting strains produced by the lurching of the body on the truck-bolster without injury or yielding.

To further strengthen and stiffen the frame two intersecting braces $A^2$ may be used on the end of truck where the motor is not suspended, the braces being connected to an end beam B and to an intermediate transverse tie-bar which is secured centrally between the beams A as hereinafter described. Said braces are sufficiently above the axle to give ample clearance for the action of the coil springs over journal boxes. Between the legs of the pedestals are stays $C'$ shouldered between the legs and extending to the outside thereof and also lipped to the outside of the pedestal as shown being secured thereto by bolts $C^2$. These stays can be readily removed by loosening the nuts on these bolts, so that the wheels and axles can be readily removed from the frame.

Between the pedestals on each side of the truck and resting on the bottoms thereof are two bottom stays formed of flat bars $c$ set edgewise and secured to the pedestals by bolts or rivets $c'$ with a pipe thimble $c^2$ on the bolts to hold the bars apart, and by which means the two pedestals are securely united together. At each corner of the truck is a flat brace $c^4$ which extends from the bottom of outer leg of the adjoining pedestal to the outer end of side beams and is suitably secured at each end. By this means a stiff and strong metallic truck frame is produced, and each side thereof is thoroughly braced and trussed. In the center and hung upon each side beam is an inverted U-shaped yoke D the lower ends of which are bent at right angles to form steps $d$ upon which are seated elliptic springs E, E, one at each side of each side beam as shown. These springs are held in place by means of clips $e$ which are bolted to a tie bar F extending across the truck frame, at the centers thereof. The yokes are rivetted or bolted to the side beams to prevent their moving thereon. The bar F constitutes a rigid connection between the opposite side beams, and being nearly on a line with the centers of axles prevent the frame spreading, and the pedestals from being forced out of line by reason of the end thrust of the axles when rounding curves at high speed. This plate also prevents the ends of yokes from sagging by reason of the weight of car resting on springs E, E. Between the main leaves of each elliptic spring E and the confining band $E'$ are placed short auxiliary spring-leaves $E^2$ the ends of which are curved more than the main leaves, so that after the spring is compressed a certain extent, the ends of leaves $E^2$ contact thereby re-inforcing the springs and adding to its sustaining capacity.

The truck bolster is constructed of two flat metal bars, laid flatwise, the top bar being straight, and the bottom bar $G'$ inversely arched or trussed and separated from the top plate by a center casting $g$ which has a central vertical opening for the passage of the king bolt, and two sleeves $g'$ on its ends for the passage of tie bolts $g^2$. To further strengthen the bolster, small tubular columns H, H, are placed between bars G, $G'$ at each side of casting $g$, through which pass the tie bolts or rivets $h$. The ends of bars G and $G'$ are rigidly united by welding, riveting or other suitable manner. The bolster overlies bar F and is supported upon springs E, E, as shown. Near each end of the bolster and firmly secured thereon above the springs is a side bearing casting I, horizontally curved as shown, on the arc of a circle having a king bolt as a center. These castings have transverse recesses $I'$ to receive the ends of bolster, and are further secured thereto by bolts or rivets as desired. To each side bearing is rigidly secured depending guide pins $i$ one at each side of the bolster, which depend through corresponding vertical guide holes $a^3$ in the side beams, formed exactly on the center line thereof, as by expanding the bars $a, a,$ at the points where such openings are to be made as indicated in Fig. 6 of the drawings. On the lower ends of these guide pins and below the side beams are nuts $i'$ screwed on with suitable devices to prevent them unscrewing, and between the nuts and lower edge of side beams are cushions $i^2$ of rubber or metal springs which will prevent shock when the elliptic springs react, when the car is in service. Thus when the truck is in use, the weight of the car body on the bolster is transferred to the frame through springs E, E, and when they act the guide pins play up and down through the openings in side beams so that a perfectly free and elastic action is allowed the car body.

The guide pins serve to keep the truck square, and also prevent the side beams spreading, and thus the cross centers commonly used in steam railway car trucks are dispensed with.

Between bars $c$ are secured step castings J through which pass vertical bolts $j$ to which are secured the ends of the motor suspension bar K which extends across the truck from one bottom stay to the other, and can be placed edgewise or flatwise, as the motor may require. The suspension bar also serves to prevent the frame or pedestals spreading laterally and assists in overcoming the end thrust of the axles. Cushioning springs $k$ are inserted between the ends of bars K and the castings J, and cushioning springs may also be placed above the same. These springs may be of rubber or metal as indicated in Figs. 7 and 8.

The position of the motor is indicated in dotted lines in Fig. 1.

The car body Z is mounted on the bolster and side castings and is fast to the truck only at one point, the king bolt L. Therefore the body will not be affected by the oscillations of the truck due to rapid travel over switches and railjoints, and as the truck radiates beneath the car on a positive center, there is no danger of the wheels being forced off the rails, and the truck readily shifts on curves.

I would say that I contemplate making the side bearing I of wrought metal, and may weld them onto the bolster so as to form the bolster and side bearings virtually in one piece and consider such construction covered in the claims.

In Fig. 9 I have shown a modified construction of the side beams in which one solid bar is used between the pedestals swollen out at the points where holes $a^3$ are made, and split at the ends or having two bars welded on at each end to receive the pedestals. This form I also consider equivalent to that before described, and covered by my claims.

As some persons prefer wooden frames, I have indicated the side beams as made of wood in Fig. 10, being reinforced on each side by metal plates. The yoke on which the springs are mounted would be hung over these side beams as above described. Therefore I do not limit myself to the employment of the novel spring mountings of the bolster or metallic frames alone.

I would further add that semi-elliptic springs may be sometimes employed instead of the full elliptic springs, and when "elliptical" is used referring to springs both full elliptic and semi-elliptic springs are embraced.

Having thus described my invention, what I claim as new, and desire to secure by Letters Patent, is—

1. The combination with the side beams of a truck frame, and the yokes hung thereon intermediate the pedestals, of elliptical springs on each side of each side beam of the frame supported on said yokes, all exterior to the wheels, substantially as specified.

2. The combination with the truck frame, of parallel elliptical springs located on each side of each side beam of the frame intermediate the pedestals, and all exterior to the wheels and the bolster supported on said springs, and the guide pins for the bolster, substantially as described.

3. The combination with the side beams of a truck, of elliptical springs beside each side beam and parallel therewith intermediate the pedestals, and all exterior to the wheels the bolster mounted on said springs and the guide pins for the bolster, substantially as specified.

4. The combination with the side beams of a truck frame of elliptical springs on each side of each side beam of the frame and intermediate the pedestals, and all exterior to the wheels and the bolster mounted on said springs, and the guide pins for said bolster, substantially as set forth.

5. The combination of the truck frame, and the bolster supporting springs with the bolster mounted thereon, and the guide pins for said bolster attached thereto and playing through guides on the frame substantially as described.

6. The combination of the truck-frame, with the bolster mounted thereon, and the guide pins for said bolster attached thereto and playing through guides on the frame, and the springs interposed between the bolster and frame, substantially as specified.

7. A metallic side beam for a truck frame split or divided at its extremities where the pedestals are to be attached, substantially as and for the purpose set forth.

8. The combination of the truck frame, the springs supported thereon intermediate the pedestals, the bolster supported on said springs, and the guide pins rigidly connected to the bolster and playing through vertical guide openings, substantially as described.

9. The combination of the truck frame, a pair of elliptic springs one on each side of each side beam intermediate the wheels and suspended from said beams; with the bolster supported upon said springs, and the guide pins rigidly connected to said bolster, substantially as specified.

10. The combination of the truck frame, a pair of inverted U-shaped yokes suspended on the side beams thereof intermediate the wheels, the springs mounted on said yokes, the bolster supported on said springs, and the rigid guide pins attached to the bolster playing through guides on the frame to prevent lateral movement of the bolster, substantially as and for the purpose described.

11. The combination of the frame, the springs supported on the side beams thereof intermediate the wheels at each side of the truck, the bolster supported on said springs, and the side-bearing castings connected to the bolster, and the guide pins rigidly attached to said castings, all constructed substantially as described.

12. The combination of the truck frame, the pair of inverted U-shaped yokes suspended on the side beams thereof intermediate the wheels, the springs mounted on said yokes, the bolster supported on said springs, the side-bearing castings secured to the bolster, and the guide pins depending from said castings, substantially as specified.

13. The combination of the frame, the transverse tie bar suspended from the side beams thereof intermediate the wheels, the springs at the end of said tie bar beside each side beam; the bolster mounted on said springs, and the depending guide pins connected to said bolster, substantially as and for the purpose described.

14. The combination of the frame, the U shaped yokes suspended from the side beams intermediate the wheels, the springs mounted on said yokes, the tie bar secured to said yokes, the bolster supported on said springs, the side-bearing castings connected to the ends of said bolster, and the depending guide pins rigidly secured to said castings, all constructed and arranged to operate substantially as set forth.

15. For a truck frame a side beam composed of two bars $a, a$, set edgewise, bound together intermediate the wheels, but separated at the points where the pedestals are attached, substantially as and for the purpose described.

16. The combination with the side beams, of the end beams composed of two parallel flat bars laid flatwise, and the tie rods intermediate said bars, substantially as described.

17. The combination of the side beams each composed of two flat bars set edgewise, and bound together intermediate the pedestals, and separated at the pedestals; with the end beams composed of flat bars laid flatwise and the tie rods intermediate the members of the end beams and connected to the side beams, substantially as and for the purpose described.

18. For a truck frame a side beam composed of two bars $a, a$, set edgewise, bound together directly intermediate the wheels, but separated at the points where the pedestals are attached, in combination with the end beams, the pedestals, the bottom stays and corner braces, substantially as set forth.

19. The combination of the side beams each composed of two flat bars set edgewise and bound together intermediate the pedestals and separated at the pedestals; with the end beams composed of two flat bars laid flatwise, and the tie rods intermediate the members of the end beams and connected to the side beams, the pedestals, the bottom stays and corner braces, substantially as described.

20. The combination of the side and end beams, the pedestals attached to the side beams, the bottom stays intermediate the pedestals consisting of two parallel flat bars set edgewise and bolted to the legs of pedestals, the step castings secured between said bars, the motor suspension bar attached thereto and the cushioning springs on the bolts confining said suspension bars to said step castings, and the cushioning springs on said bolts, substantially as described.

21. The combination of the side and end beams, the pedestals attached to the side beams, the bottom stays intermediate the pedestals consisting of two parallel flat bars set edgewise; the stays connecting the jaws of pedestals and the flat braces between the pedestals and corners of truck frame, with the tie bar connecting the side beams intermediate the pedestals, the springs at each side of each side beam above the tie bar, the bolster mounted on said springs and the depending guide pins rigidly connected to said bolster, substantially as and for the purpose described.

22. The combination of the side beams each composed of two flat bars set edgewise, and bound together intermediate the pedestals, and separated at the pedestals; with the end beams composed of flat bars laid flatwise, and the tie rods intermediate the members of the end beams and connected to the side beams; with the tie bar connected to the side beam intermediate the pedestals where the members of the beams are bound together, the springs at each side of each side beam above said bar, the bolster mounted on said springs, and the guide pins rigidly connected to said bolster, all substantially as and for the purpose specified.

In testimony that I claim the foregoing as my own I affix my signature in presence of two witnesses.

JOHN TAYLOR.

Witnesses:
CORNELIUS J. EARLEY,
JAMES H. MCGRAW.